(12) United States Patent
Yoshida et al.

(10) Patent No.: US 9,103,278 B2
(45) Date of Patent: Aug. 11, 2015

(54) STRADDLE-TYPE VEHICLE

(71) Applicant: YAMAHA HATSUDOKI KABUSHIKI KAISHA, Iwata-shi, Shizuoka (JP)

(72) Inventors: Yasutaka Yoshida, Shizuoka (JP); Masahito Kawase, Shizuoka (JP); Katsuyoshi Ooishi, Shizuoka (JP); Daisuke Hamada, Shizuoka (JP); Katsumi Fujimura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/231,986

(22) Filed: Apr. 1, 2014

(65) Prior Publication Data

US 2014/0345259 A1  Nov. 27, 2014

(30) Foreign Application Priority Data

May 23, 2013 (JP) ................................. 2013-108645

(51) Int. Cl.
*F01N 1/00* (2006.01)
*F02B 75/20* (2006.01)
*B62M 7/02* (2006.01)
*F02M 35/112* (2006.01)
*F02M 35/16* (2006.01)
*F02B 27/04* (2006.01)
(Continued)

(52) U.S. Cl.
CPC .................. *F02B 75/20* (2013.01); *B62M 7/02* (2013.01); *F01N 13/08* (2013.01); *F02B 27/04* (2013.01); *F02B 61/02* (2013.01); *F02M 35/112* (2013.01); *F02M 35/162* (2013.01); *F02B 2075/1812* (2013.01)

(58) Field of Classification Search
CPC ..... F01N 13/04; F01N 13/08; F01N 2340/04; F01N 2590/04; F01N 3/28; F01N 3/281; F01N 3/2842; F01N 13/009; F01N 13/017; F01N 2330/02
See application file for complete search history.

(56) References Cited

U.S. PATENT DOCUMENTS 4,116,172 A * 9/1978 Lohr et al. .................... 123/54.7
4,311,009 A * 1/1982 Elsbett et al. ................ 60/605.1
(Continued)

FOREIGN PATENT DOCUMENTS

EP  0 441 461 A2  8/1991
EP  0 745 767 A2  12/1996
(Continued)

OTHER PUBLICATIONS

Sixes from Volvo, Mar. 6, 2009, http://web.origin.volvocars.com/intl/top/corporate-old/pages/default.aspx?itemid=63.*
(Continued)

*Primary Examiner* — Jesse Bogue
(74) *Attorney, Agent, or Firm* — Keating & Bennett, LLP

(57) ABSTRACT

An engine of a straddle-type vehicle includes first, second, and third cylinders arranged, in this order, from right to left in a front view of the vehicle; first, second, and third intake pipes in communication with the first, second, and third cylinders, respectively; and first, second, and third exhaust pipes in communication with the first, second, and third cylinders, respectively. The first, second, and third exhaust pipes have different lengths and the first, second, and third intake pipes have different lengths.

15 Claims, 9 Drawing Sheets

(51) Int. Cl.
 *F02B 61/02* (2006.01)
 *F01N 13/08* (2010.01)
 *F02B 75/18* (2006.01)

(56) References Cited

U.S. PATENT DOCUMENTS

| | | | | |
|---|---|---|---|---|
| 4,437,306 | A | * | 3/1984 | Ikenoya et al. ................ 60/293 |
| 4,890,586 | A | * | 1/1990 | Fujii et al. ................ 123/184.55 |
| 6,901,898 | B1 | * | 6/2005 | Oberg et al. ............. 123/184.55 |
| 7,290,388 | B2 | * | 11/2007 | Kikuchi et al. ................ 60/323 |
| 7,350,351 | B2 | * | 4/2008 | Ueshima et al. ................ 60/299 |
| 7,540,347 | B2 | * | 6/2009 | Taniguchi et al. ............ 180/219 |
| 7,610,748 | B2 | * | 11/2009 | Kono et al. ...................... 60/276 |
| 7,699,134 | B2 | * | 4/2010 | Terashima et al. ............ 180/309 |
| 7,802,424 | B2 | * | 9/2010 | Kanzawa et al. ................ 60/324 |
| 8,033,357 | B2 | * | 10/2011 | Nishijima .................... 180/296 |
| 8,459,016 | B2 | * | 6/2013 | Ashida et al. .................. 60/323 |
| 8,713,923 | B2 | * | 5/2014 | Morita et al. .................... 60/313 |
| 8,783,024 | B2 | * | 7/2014 | Ono et al. ........................ 60/299 |
| 2005/0247287 | A1 | | 11/2005 | Kondo et al. |
| 2014/0041641 | A1 | * | 2/2014 | Carlson et al. ................ 123/520 |

FOREIGN PATENT DOCUMENTS

| | | |
|---|---|---|
| EP | 0 785 343 A1 | 7/1997 |
| EP | 1 293 653 A1 | 3/2003 |
| EP | 1 515 037 A1 | 3/2005 |
| EP | 1 767 446 A2 | 3/2007 |
| GB | 2 369 092 A | 5/2002 |
| JP | 2007-083849 A | 4/2007 |

OTHER PUBLICATIONS

Official Communication issued in corresponding European Patent Application No. 14160671.5, mailed on Sep. 8, 2014.

* cited by examiner

STRADDLE-TYPE VEHICLE

BACKGROUND OF THE INVENTION

1. Field of the Invention

The present invention relates to straddle-type vehicles.

The present application claims priority to Japanese Patent Application No. 2013-108645 filed in Japan on May 23, 2013, the entire contents of which are hereby incorporated by reference.

2. Description of the Related Art

A straddle-type vehicle including an engine in which three cylinders are arranged in alignment with each other in a lateral direction of the vehicle, i.e., a "parallel three cylinder engine", is conventionally known. JP 2007-83849 A discloses a motorcycle including a parallel three cylinder engine.

The parallel three cylinder engine disclosed in JP 2007-83849 A includes three exhaust pipes in communication with three cylinders. The exhaust pipes are first extended forward and then bent leftward and downward in a front view of the motorcycle so as to be connected to a bundle portion into which the exhaust pipes are collected. A muffler is connected to the bundle portion.

In a parallel three cylinder engine, when an attempt is made to equalize lengths of three exhaust pipes, flexibility of locating the three exhaust pipes is disadvantageously reduced. Besides, the resulting exhaust pipes might unfavorably be complicated in shape. A conceivable solution to these problems is to allow the three exhaust pipes to have different lengths.

However, merely allowing three exhaust pipes to have different lengths causes combustion variations between cylinders, thus making it impossible for a parallel three cylinder engine to deliver its original performance. Another conceivable solution is to devise an engine control method so as to reduce combustion variations, but devising such a method results in complicated control.

SUMMARY OF THE INVENTION

Accordingly, preferred embodiments of the present invention provide a straddle-type vehicle that includes a parallel three cylinder engine that delivers its original performance without equalizing lengths of the exhaust pipes.

A straddle-type vehicle according to a preferred embodiment of the present invention includes an internal combustion engine that includes a first cylinder, a second cylinder disposed leftward of the first cylinder in a front view of the vehicle, and a third cylinder disposed leftward of the second cylinder in the front view of the vehicle; a first intake pipe in communication with the first cylinder, a second intake pipe in communication with the second cylinder, and a third intake pipe in communication with the third cylinder; and a first exhaust pipe in communication with the first cylinder, a second exhaust pipe in communication with the second cylinder, and a third exhaust pipe in communication with the third cylinder. The first, second, and third exhaust pipes have different lengths. The first, second, and third intake pipes have different lengths.

In the above-described straddle-type vehicle, there is no need to equalize the lengths of the first, second, and third exhaust pipes, thus making it possible to increase the flexibility of locating the first, second, and third exhaust pipes. Besides, the first, second, and third exhaust pipes are easily prevented from being complicated in shape. Unfortunately, when the lengths of the first, second, and third exhaust pipes are different from each other, it is likely that there will occur combustion variations between the cylinders of the internal combustion engine. However, in the above-described straddle-type vehicle, the lengths of the first, second, and third intake pipes are also different from each other. Therefore, it is unnecessary to equalize the lengths of the first, second, and third intake pipes, thus making it possible to set the length of each intake pipe so as to reduce combustion variations between the cylinders without being restricted to the lengths of the other intake pipes. As a result, the parallel three cylinder engine is allowed to deliver its original performance without equalizing the lengths of the first, second, and third exhaust pipes.

According to a preferred embodiment of the present invention, the shortest of the first, second, and third intake pipes is preferably in communication with the cylinder with which the longest of the first, second, and third exhaust pipes is in communication. The longest of the first, second, and third intake pipes is preferably in communication with the cylinder with which the shortest of the first, second, and third exhaust pipes is in communication.

According to the above-described preferred embodiment, it is possible to reduce combustion variations between the cylinders more favorably without performing complicated control.

According to another preferred embodiment of the present invention, the longest of the first, second, and third exhaust pipes preferably is the second exhaust pipe.

According to the above-described preferred embodiment, each of the first, second, and third exhaust pipes is capable of being disposed at a suitable position.

According to still another preferred embodiment of the present invention, the straddle-type vehicle preferably further includes an air cleaner connected to the first, second, and third intake pipes.

According to the above-described preferred embodiment, the first, second, and third intake pipes have different lengths, but are connected to the same air cleaner.

According to yet another preferred embodiment of the present invention, the air cleaner preferably includes a first insertion opening into which the first intake pipe is inserted, a second insertion opening into which the second intake pipe is inserted, and a third insertion opening into which the third intake pipe is inserted. The first intake pipe preferably includes a first opening end disposed inside the air cleaner, the second intake pipe preferably includes a second opening end disposed inside the air cleaner, and the third intake pipe preferably includes a third opening end disposed inside the air cleaner. A length of the first intake pipe from the first insertion opening to the first opening end, a length of the second intake pipe from the second insertion opening to the second opening end, and a length of the third intake pipe from the third insertion opening to the third opening end are preferably different from each other.

According to the above-described preferred embodiment, lengths of portions of the first, second, and third intake pipes which are located outside of the air cleaner do not necessarily have to be different from each other. Consequently, flexibility of locating the first, second, and third intake pipes is increased.

According to still yet another preferred embodiment of the present invention, the internal combustion engine preferably includes a crankcase; a cylinder body that contains the first, second, and third cylinders and is connected to the crankcase; and a cylinder head to which the first, second, and third intake pipes and the first, second, and third exhaust pipes are connected, the cylinder head being connected to the cylinder body. The straddle-type vehicle preferably includes an exhaust manifold which is disposed below the crankcase and to which the first, second, and third exhaust pipes are connected.

According to the above-described preferred embodiment, the exhaust manifold is disposed below the crankcase and, therefore, an overall lateral length of the internal combustion engine and the exhaust manifold are shorter than when the exhaust manifold is disposed rightward or leftward of the crankcase.

According to another preferred embodiment of the present invention, the first cylinder is preferably disposed rightward of a vehicle center line in the front view of the vehicle, and the third cylinder is preferably disposed leftward of the vehicle center line in the front view of the vehicle. The exhaust manifold is preferably disposed rightward or leftward of the vehicle center line in the front view of the vehicle.

According to the above-described preferred embodiment, the exhaust manifold is disposed so as to be deviated to the right or left from the vehicle center line. In such a case, if an attempt is made to equalize the lengths of the first, second, and third exhaust pipes, locations of the exhaust pipes are severely restricted, and shapes of the exhaust pipes are likely to be complicated. Hence, an advantageous effect of the present preferred embodiment of the present invention which reduces combustion variations without equalizing the lengths of the first, second, and third exhaust pipes is particularly pronounced.

According to still another preferred embodiment of the present invention, when one of a rightward end and a leftward end in the front view of the vehicle is defined as a first end and the other end is defined as a second end, the exhaust manifold is preferably disposed closer to the first end than the vehicle center line. The first exhaust pipe preferably includes a portion located closer to the second end than an axis of the first cylinder, the second exhaust pipe preferably includes a portion located closer to the second end than an axis of the second cylinder, and the third exhaust pipe preferably includes a portion located closer to the second end than an axis of the third cylinder.

In order to allow the parallel three cylinder engine to deliver its original performance, it is important to sufficiently ensure the lengths of the first, second, and third exhaust pipes. According to the above-described preferred embodiment, each exhaust pipe has such a shape so as to extend rightward and then extend leftward in the front view of the vehicle, or has such a shape so as to extend leftward and then extend rightward in the front view of the vehicle. Therefore, the length of each exhaust pipe is sufficiently ensured within a small space around the crankcase, the cylinder body, and the cylinder head. As a result, the first, second, and third exhaust pipes are compactly disposed while the original performance of the parallel three cylinder engine is maintained.

According to yet another preferred embodiment of the present invention, each of the first, second, and third exhaust pipes preferably includes a connection that is connected to the exhaust manifold. The connection of the longest of the first, second, and third exhaust pipes is preferably disposed below the connections of the other two exhaust pipes.

According to a preferred embodiment of the present invention, the first, second, and third exhaust pipes are not restricted to being equal in length, and therefore, the connections of the first, second, and third exhaust pipes are easily disposed at such positions. According to the above-described preferred embodiment, the lateral length of the exhaust manifold is shorter than when the connections of the first, second, and third exhaust pipes are arranged in alignment with each other in a lateral direction of the vehicle.

According to still yet another preferred embodiment of the present invention, in the front view of the vehicle, at least one of the first, second, and third exhaust pipes preferably includes a portion that overlaps with the axis of the cylinder with which the adjacent exhaust pipe is in communication.

According to the above-described preferred embodiment, it is possible to further ensure the lengths of the first, second, and third exhaust pipes. Consequently, the internal combustion engine is more likely to deliver its original performance.

According to another preferred embodiment of the present invention, the straddle-type vehicle preferably further includes a first connection pipe connected to the first exhaust pipe and the second exhaust pipe, and a second connection pipe connected to the second exhaust pipe and the third exhaust pipe.

According to the above-described preferred embodiment, the first exhaust pipe and the second exhaust pipe are in communication with each other through the first connection pipe, and the second exhaust pipe and the third exhaust pipe are in communication with each other through the second connection pipe. Thus, pressure fluctuations in the first, second, and third exhaust pipes are reduced, and therefore, fluctuations in the output torque of the internal combustion engine are reduced.

According to still another preferred embodiment of the present invention, the first connection pipe preferably includes a first connection connected to a portion of the first exhaust pipe which is located upstream of a midpoint position of the first exhaust pipe, and a second connection connected to a portion of the second exhaust pipe which is located upstream of a midpoint position of the second exhaust pipe. The second connection pipe preferably includes a first connection connected to a portion of the second exhaust pipe which is located upstream of the midpoint position of the second exhaust pipe, and a second connection connected to a portion of the third exhaust pipe which is located upstream of a midpoint position of the third exhaust pipe.

According to the above-described preferred embodiment, pressure fluctuations in the first, second, and third exhaust pipes are reduced in farther upstream regions thereof. As a result, fluctuations in the output torque of the internal combustion engine are more effectively reduced.

According to yet another preferred embodiment of the present invention, the straddle-type vehicle may be a motorcycle.

Thus, the motorcycle that achieves the above-described effects can be obtained.

Various preferred embodiments of the present invention provide a straddle-type vehicle that includes a parallel three cylinder engine capable of delivering its original performance without equalizing lengths of exhaust pipes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
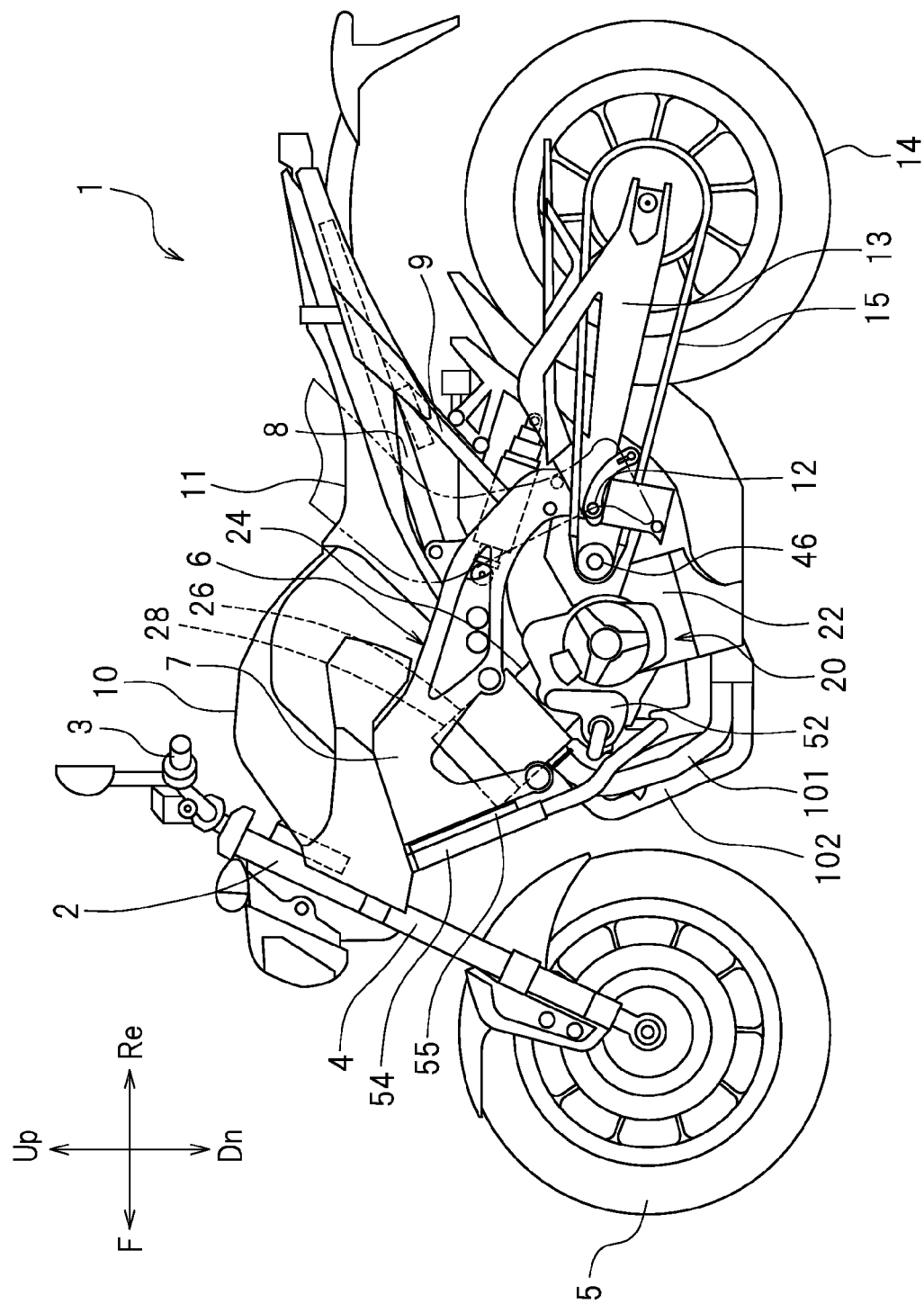
FIG. 1 is a left side view of a motorcycle according to a preferred embodiment of the present invention.
Figure 2:
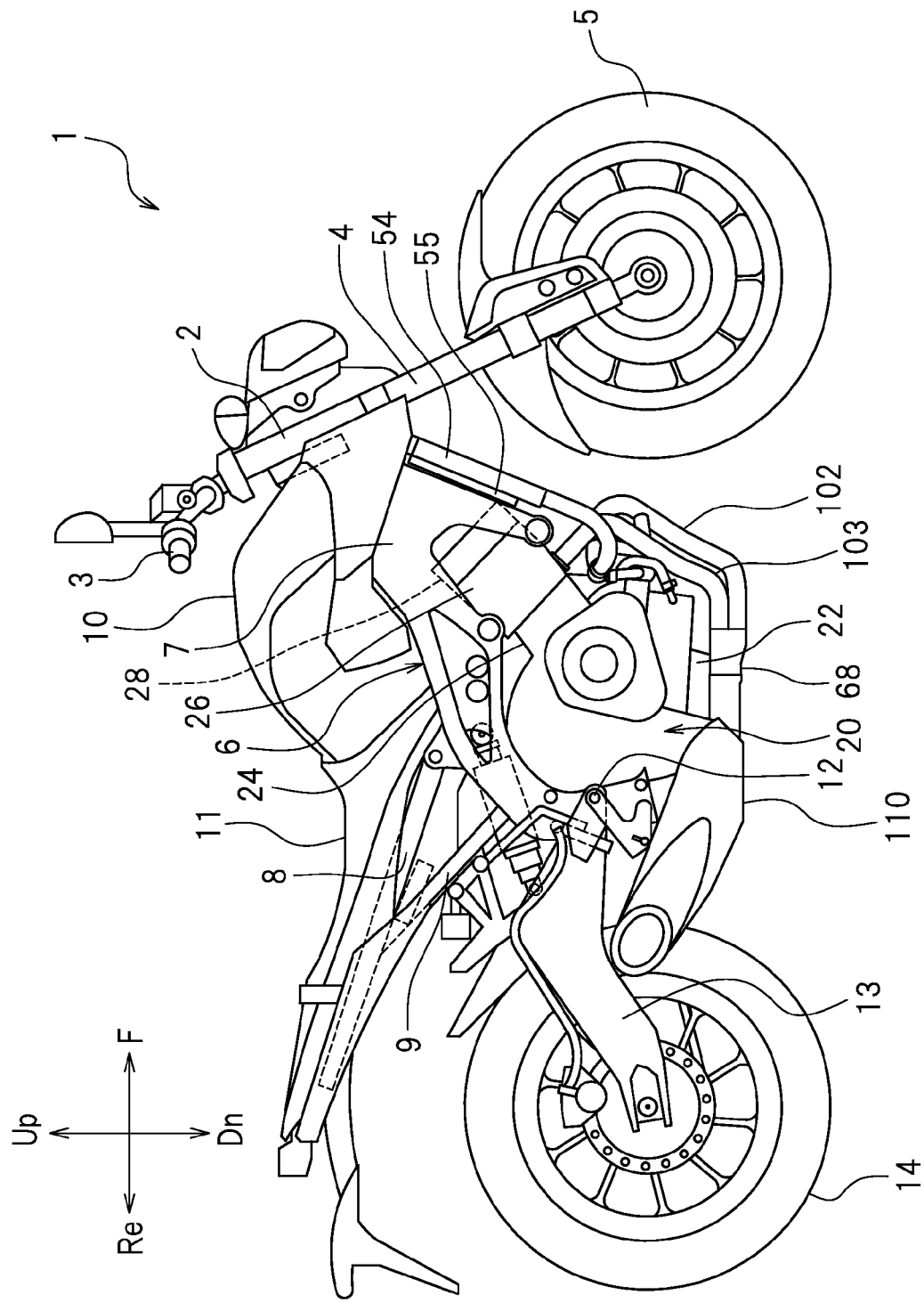
FIG. 2 is a right side view of the motorcycle according to a preferred embodiment of the present invention.

FIG. 1 is a left side view of a motorcycle (straddle-type vehicle) 1 according to a preferred embodiment of the present invention, and FIG. 2 is a right side view of the motorcycle 1. In the following description, unless otherwise specified, "front", "rear", "right", "left", "up" and "down" indicate front, rear, right, left, up and down with respect to a rider sitting on a seat 11 of the motorcycle 1, respectively. "Up" and "down" correspond to a vertically upward direction and a vertically downward direction when the motorcycle 1 is brought to a stop on a horizontal plane, respectively. Reference signs "F", "Re", "R", "L", "Up" and "Dn" in the drawings represent front, rear, right, left, up and down, respectively. It is to be noted that directions defined as viewed from the front of the vehicle may also be used in the following description. When the directions defined as viewed from the front of the vehicle and the directions defined with respect to the rider sitting on the seat 11 are compared to each other, right and left are reversed. Specifically, left and right defined as viewed from the front of the vehicle correspond to right and left defined with respect to the rider sitting on the seat 11, respectively. Reference signs "R'" and "L'" indicate right and left defined as viewed from the front of the vehicle.

As illustrated in FIG. 1, the motorcycle 1 preferably includes a head pipe 2. A handlebar 3 is supported by the head pipe 2 so that the handlebar 3 can be turned to the right and left. A front fork 4 is connected to a lower end portion of the handlebar 3. A front wheel 5 is rotatably supported by a lower end portion of the front fork 4. A body frame 6 is fixed to the head pipe 2. The body frame 6 preferably includes a main frame 7 that extends obliquely downward and rearward from the head pipe 2 in a side view of the vehicle, a seat frame 8 that extends obliquely upward and rearward from the main frame 7 in the side view of the vehicle, and a back stay 9 connected to the main frame 7 and the seat frame 8. A fuel tank 10 is disposed rearward of the head pipe 2, and the seat 11 is disposed rearward of the fuel tank 10. The fuel tank 10 and the seat 11 are supported by the body frame 6. A rear arm 13 is rotatably supported by the main frame 7. A front end portion of the rear arm 13 is connected to the main frame 7 via a pivot shaft 12. A rear wheel 14 is rotatably supported by a rear end portion of the rear arm 13.

An internal combustion engine 20 is supported by the body frame 6. The internal combustion engine 20 is preferably a "parallel three cylinder engine" as will be described below, for example. Hereinafter, the internal combustion engine 20 will simply be referred to as the "engine 20". The engine 20 preferably includes a crankcase 22, a cylinder body 24 that extends obliquely upward and forward from the crankcase 22, a cylinder head 26 that extends obliquely upward and forward from the cylinder body 24, and a head cover 28 connected to a front end portion of the cylinder head 26. In the present preferred embodiment, the cylinder body 24 preferably is integral with the crankcase 22. Alternatively, the cylinder body 24 and the crankcase 22 may be separate components. The engine 20 preferably includes a drive shaft 46 that outputs a driving force. The drive shaft 46 is connected to the rear wheel 14 via a chain 15.

Figure 3:
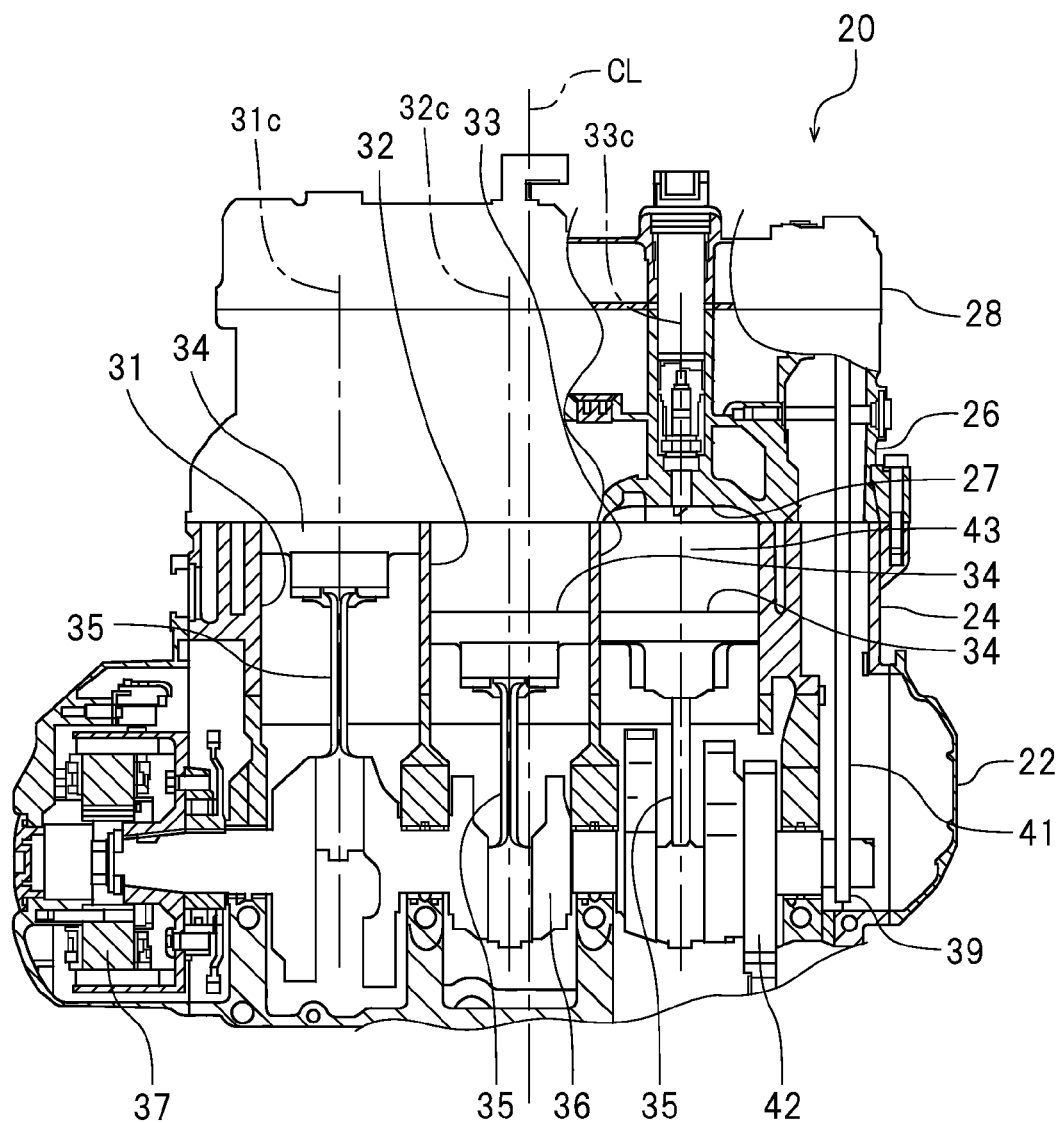
FIG. 3 is a partial cross-sectional view of an engine.

As illustrated in FIG. 3, a first cylinder 31, a second cylinder 32, and a third cylinder 33 are provided inside the cylinder body 24. The first, second, and third cylinders 31, 32 and 33 are disposed, in this order, from left to right. When the directions defined with respect to the rider sitting on the seat 11 and the directions defined as viewed from the front of the vehicle are compared to each other, right and left are reversed. Therefore, the first, second, and third cylinders 31, 32, and 33 are disposed in this order from right to left in the front view of the vehicle. The first, second, and third cylinders 31, 32, and 33 are arranged in alignment with each other in a lateral direction of the motorcycle 1. A piston 34 is contained in each of the first, second, and third cylinders 31, 32, and 33. Each piston 34 is connected to a crankshaft 36 via a connecting rod 35. The crankshaft 36 is contained in the crankcase 22.

Concaves 27 are provided in portions of the cylinder head 26 which are located above the first, second, and third cylinders 31, 32, and 33. The cylinders 31 to 33, the pistons 34, and the concaves 27 define combustion chambers 43. The cylinder head 26 is provided with intake ports 95 (see FIG. 5) and exhaust ports 96 (see FIGS. 5 and 6) which are in communication with the combustion chambers 43.

A generator 37 is attached to a left end portion of the crankshaft 36. A sprocket 39 is attached to a right end portion of the crankshaft 36. A cam chain 41 is wound around the sprocket 39. A gear 42 is fixed to a portion of the crankshaft 36 which is located leftward of the sprocket 39.

Figure 4:
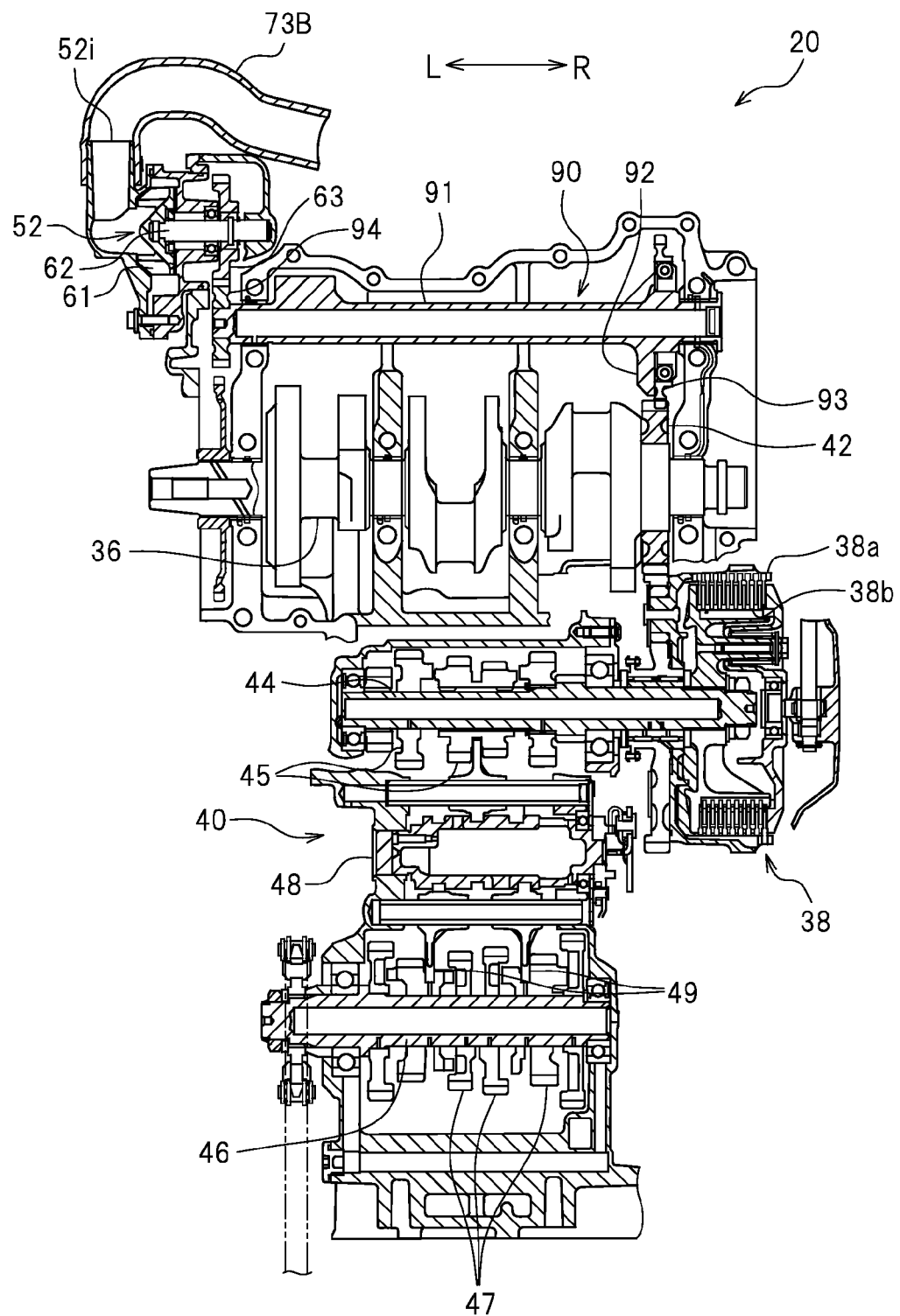
FIG. 4 is another partial cross-sectional view of the engine.

As illustrated in FIG. 4, the engine 20 preferably includes a clutch 38. The clutch 38 preferably includes a clutch housing 38a and a clutch boss 38b. The clutch housing 38a is connected to the gear 42. A torque of the crankshaft 36 is transmitted to the clutch housing 38a via the gear 42. The clutch housing 38a rotates together with the crankshaft 36. A main shaft 44 is fixed to the clutch boss 38b.

The engine 20 preferably includes a transmission 40. The transmission 40 preferably includes a plurality of gears 45 provided at the main shaft 44, a plurality of gears 47 provided at the drive shaft 46, a shift drum 48, and a shift fork 49. Upon rotation of the shift drum 48, the shift fork 49 causes the gears 45 and/or the gears 47 to move axially, thus changing a combination of the gears 45 and 47 which intermesh with each other. As a result, a transmission gear ratio is changed.

The engine 20 preferably includes a balancer 90. The balancer 90 preferably includes a balancer shaft 91, and a balancer weight 92 provided at the balancer shaft 91. A gear 93 that intermeshes with the gear 42 is fixed to a right portion of the balancer shaft 91. The balancer shaft 91 is connected to the crankshaft 36 via the gear 42 and the gear 93. The balancer shaft 91 is driven by the crankshaft 36, and is rotated together with the crankshaft 36. A gear 94 is fixed to a left end portion of the balancer shaft 91.

The gear 42 is preferably press-fitted to the crankshaft 36. As mentioned above, the gear 42 intermeshes with both of the clutch housing 38a of the clutch 38 and the gear 93 of the balancer 90. The gear 42 preferably includes a press-fitted gear, thus making it possible to reduce an outer diameter of the gear 42. A reduction in the outer diameter of the gear 42 reduces a distance between the crankshaft 36 and the main shaft 44 and a distance between the crankshaft 36 and the balancer shaft 91. Note that the crankshaft 36, the main shaft 44, the drive shaft 46 and the balancer shaft 91 extend laterally (i.e., extend in a right-left direction), and are disposed parallel, or substantially parallel, to each other.

The engine 20 is preferably a water-cooled internal combustion engine, in which at least a portion of which is cooled by cooling water, for example. The engine 20 preferably includes a water pump 52 (see FIG. 6) that conveys cooling water, a radiator 54 (see FIG. 7) that cools the cooling water, a thermostat 58 (see FIGS. 6 and 7), and an oil cooler 56 (see FIGS. 6 and 7). As illustrated in FIG. 4, the water pump 52 preferably includes, a pump shaft 62, and an impeller 61 fixed to the pump shaft 62. A gear 63 that intermeshes with the gear 94 is fixed to the pump shaft 62. The water pump 52 is arranged so as to be driven by the balancer shaft 91.

Figure 5:
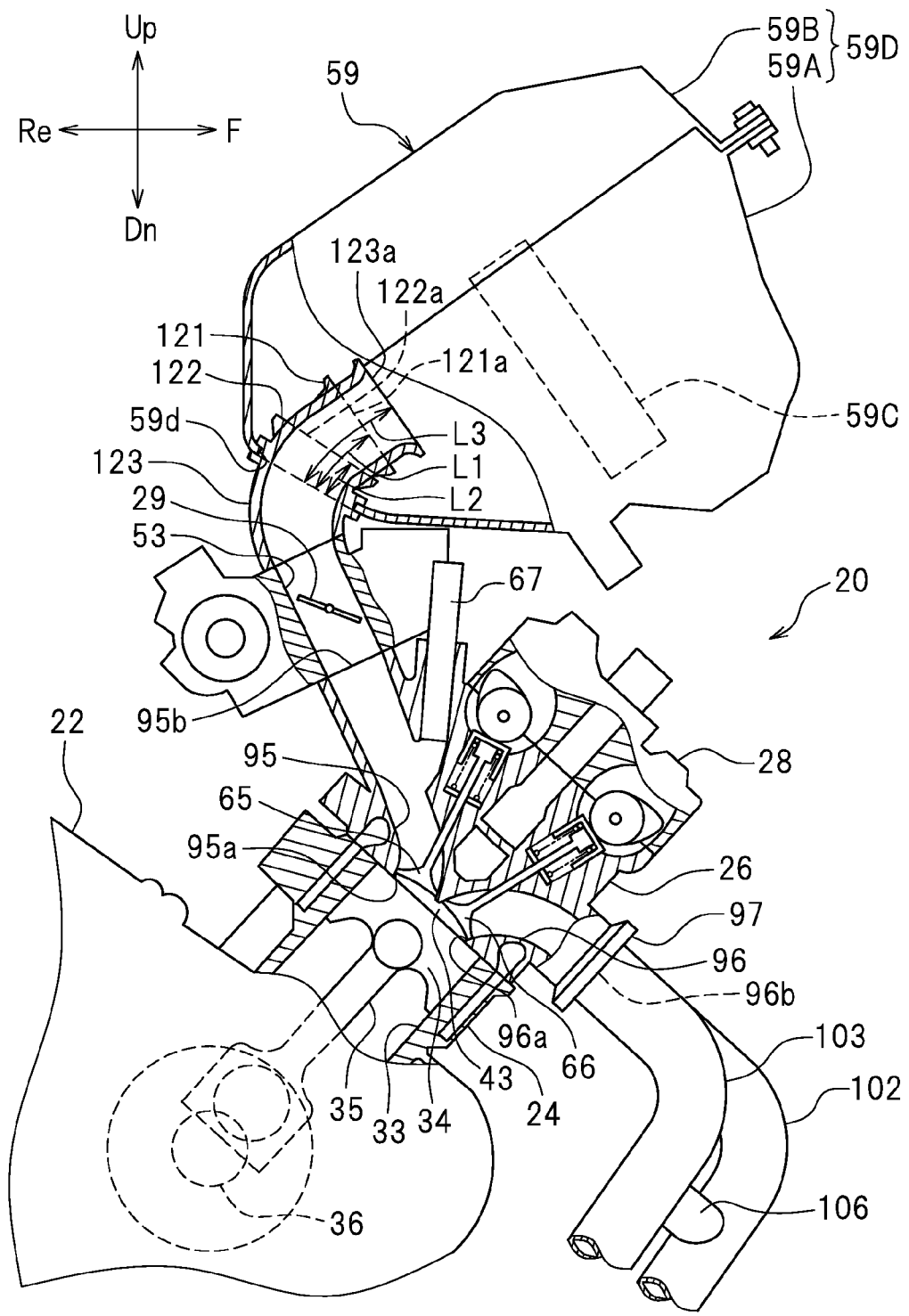
FIG. 5 is a partial cross-sectional view of the engine and an air cleaner.

As illustrated in FIG. 5, each intake port 95 preferably includes an inner end portion 95a and an outer end portion 95b. The inner end portion 95a faces the combustion chamber 43. An intake valve 65 is disposed in the intake port 95. The intake valve 65 is arranged to open and close the inner end portion 95a of the intake port 95. A fuel injection valve 67 is disposed between the inner end portion 95a and the outer end portion 95b of the intake port 95. The fuel injection valve 67 injects fuel into the intake port 95. It is to be noted that a fuel supply device of the engine 20 is not limited to the fuel injection valve 67 that injects fuel into the intake port 95, but may alternatively be a fuel injection valve that injects fuel into the combustion chamber 43. The fuel supply device is not limited to a fuel injection valve, but may alternatively be a carburetor.

A throttle body 53 that contains a throttle valve 29 is connected to the outer end portion 95b of the intake port 95. The throttle valve 29 is provided for each of the cylinders 31 to 33. The engine 20 includes the three cylinders 31 to 33 and therefore includes three throttle valves 29. The throttle bodies 53 that contain the throttle valves 29 may be separate components or may be integral with each other. In the present preferred embodiment, the throttle bodies 53 preferably are separate components, and the three throttle bodies 53 in total are disposed from right to left, for example.

Figure 6:
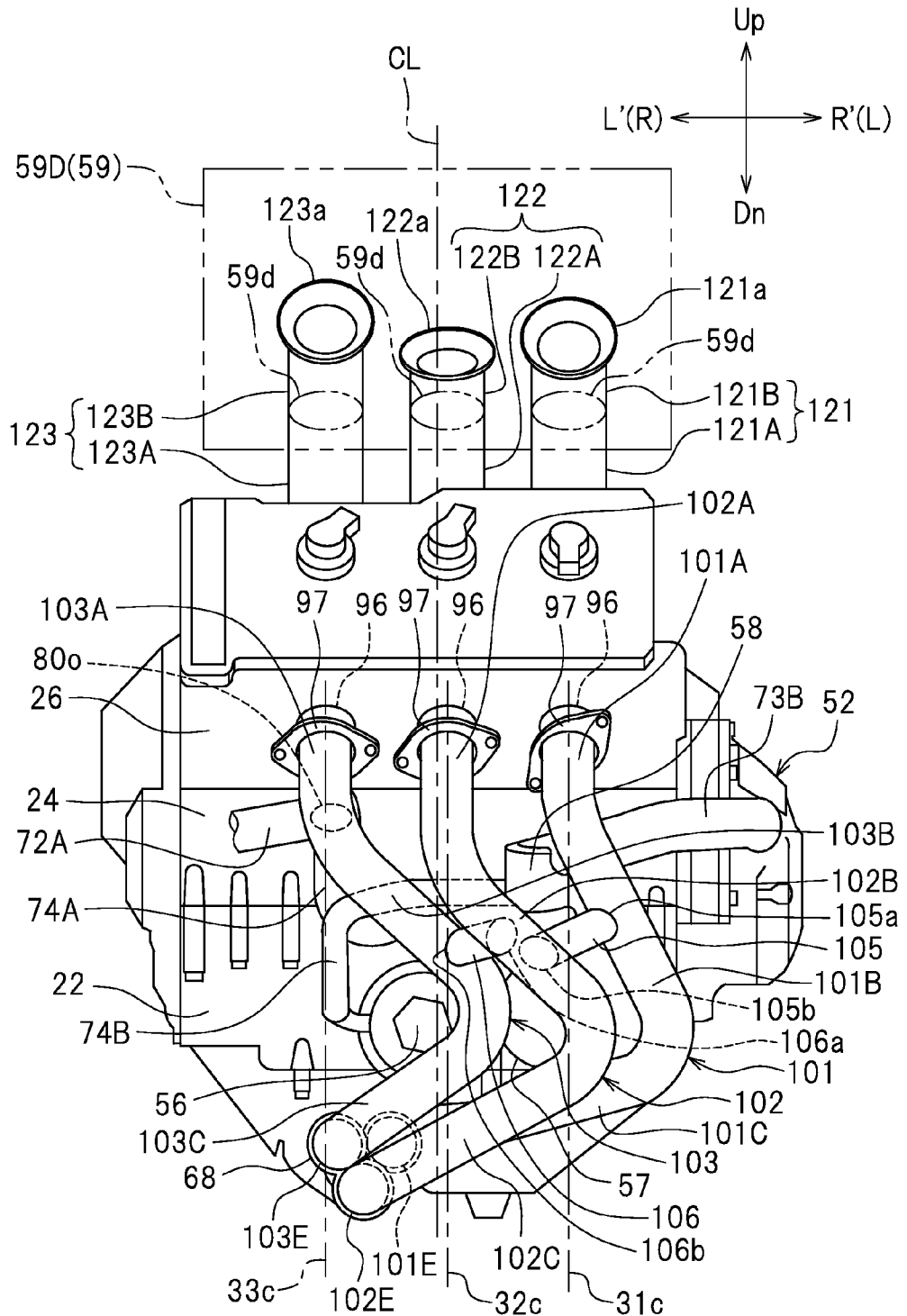
FIG. 6 is a front view of the engine.

As illustrated in FIGS. 5 and 6, a first intake pipe 121, a second intake pipe 122, and a third intake pipe 123 are connected to the right, center, and left throttle bodies 53 in the front view of the vehicle, respectively. The first, second, and third intake pipes 121, 122, and 123 are in communication with the first, second, and third cylinders 31, 32, and 33, respectively. As illustrated in FIG. 6, the first, second, and third intake pipes 121, 122, and 123 are disposed in this order from right to left and extend upward in the front view of the vehicle. As illustrated in FIG. 5, the intake pipes 121 to 123 extend obliquely upward and rearward from the throttle bodies 53 and then bend obliquely upward and forward in the side view of the vehicle. An end portion of each of the intake pipes 121 to 123 has a funnel-like shape. In other words, the end portion of each of the intake pipes 121 to 123 has an increased diameter toward its extremity.

An air cleaner 59 is disposed above the cylinder head 26 and the head cover 28. The air cleaner 59 preferably includes a lower case 59A, an upper case 59B fixed to the lower case 59A, and an element 59C disposed inside the lower case 59A and the upper case 59B. The lower case 59A and the upper case 59B define an air cleaner case 59D. It is to be noted that the air cleaner case 59D is not limited to any particular constituent component(s). Three insertion openings 59d are provided in a rear portion of the air cleaner case 59D. In this preferred embodiment, the insertion openings 59d are provided in the lower case 59A. Alternatively, the insertion openings 59d may be provided in the upper case 59B. As illustrated in FIG. 6, the three insertion openings 59d are arranged from right to left in the front view of the vehicle. In the front view of the vehicle, the first intake pipe 121 is inserted into the right insertion opening 59d, the second intake pipe 122 is inserted into the center insertion opening 59d, and the third intake pipe 123 is inserted into the left insertion opening 59d. In the following description, the terms "right", "center" and "left" used for the insertion openings 59d refer to right, center and left in the front view of the vehicle, respectively.

An opening end 121a of the first intake pipe 121, an opening end 122a of the second intake pipe 122, and an opening end 123a of the third intake pipe 123 are opened inside the air cleaner case 59D. As illustrated in FIG. 5, lengths of the three intake pipes 121 to 123 from the insertion openings 59d to the opening ends 121a to 123a are different from each other. More specifically, a length L2 between the opening end 122a of the second intake pipe 122 and the center insertion opening 59d is shorter than a length L1 between the opening end 121a of the first intake pipe 121 and the right insertion opening 59d. A length L3 between the opening end 123a of the third intake pipe 123 and the left insertion opening 59d is longer than the length L1 between the opening end 121a of the first intake pipe 121 and the right insertion opening 59d.

As illustrated in FIG. 6, each of the first, second, and third intake pipes 121, 122, and 123 preferably includes a portion located inside of the air cleaner case 59D and a portion located outside of the air cleaner case 59D. Hereinafter, inside of the air cleaner case 59D and outside of the air cleaner case 59D will simply be referred to as "inside of the air cleaner 59" and "outside of the air cleaner 59", respectively. A portion 121A of the first intake pipe 121 located outside of the air cleaner 59, a portion 122A of the second intake pipe 122 located outside of the air cleaner 59, and a portion 123A of the third intake pipe 123 located outside of the air cleaner 59 are equal in length. A portion 121B of the first intake pipe 121 located inside of the air cleaner 59, a portion 122B of the second intake pipe 122 located inside of the air cleaner 59, and a portion 123B of the third intake pipe 123 located inside of the air cleaner 59 have different lengths. Therefore, the first, second, and third intake pipes 121, 122, and 123 have different lengths. The second intake pipe 122 is shorter than the first intake pipe 121, and the third intake pipe 123 is longer than the first intake pipe 121. Of the three intake pipes 121 to 123, the third intake pipe 123 is the longest, and the second intake pipe 122 is the shortest.

As illustrated in FIG. 5, the first, second, and third intake pipes 121, 122, and 123 are equal in diameter. The first, second, and third intake pipes 121, 122, and 123 are disposed so that axes thereof correspond to each other in the side view of the vehicle. It is to be noted that dimensions and locations of the first, second, and third intake pipes 121, 122, and 123 may be changed as appropriate.

As illustrated in FIG. 5, each exhaust port 96 preferably includes an inner end portion 96a and an outer end portion 96b. The inner end portion 96a faces the combustion chamber 43. An exhaust valve 66 is disposed in the exhaust port 96. The exhaust valve 66 is arranged to open and close the inner end portion 96a of the exhaust port 96. An exhaust pipe connection port 97 is provided at the outer end portion 96b of the exhaust port 96.

As illustrated in FIG. 6, the engine 20 preferably includes a first exhaust pipe 101, a second exhaust pipe 102, and a third exhaust pipe 103 each connected to the associated exhaust pipe connection port 97. The first, second, and third exhaust pipes 101, 102 and 103 are in communication with the first, second, and third cylinders 31, 32, and 33, respectively. The exhaust pipe connection ports 97 are provided at a front portion of the cylinder head 26, and therefore, upstream end portions of the first, second, and third exhaust pipes 101, 102, and 103 are connected to the front portion of the cylinder head 26. The first, second, and third exhaust pipes 101, 102, and 103 have different lengths. More specifically, the second exhaust pipe 102 is longer than the first exhaust pipe 101, and the third exhaust pipe 103 is shorter than the first exhaust pipe 101.

Figure 7:
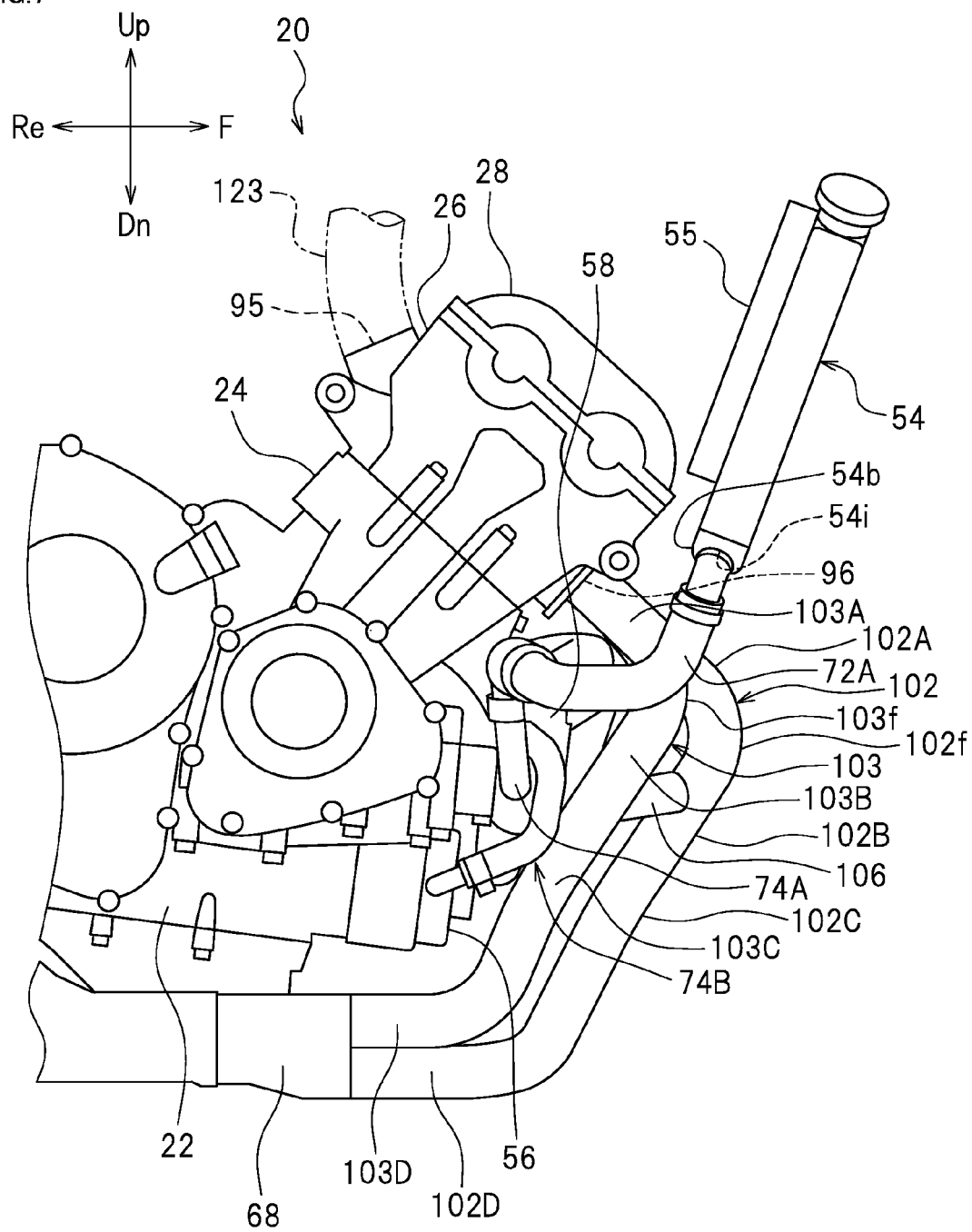
FIG. 7 is a right side view of the engine.
Figure 8:
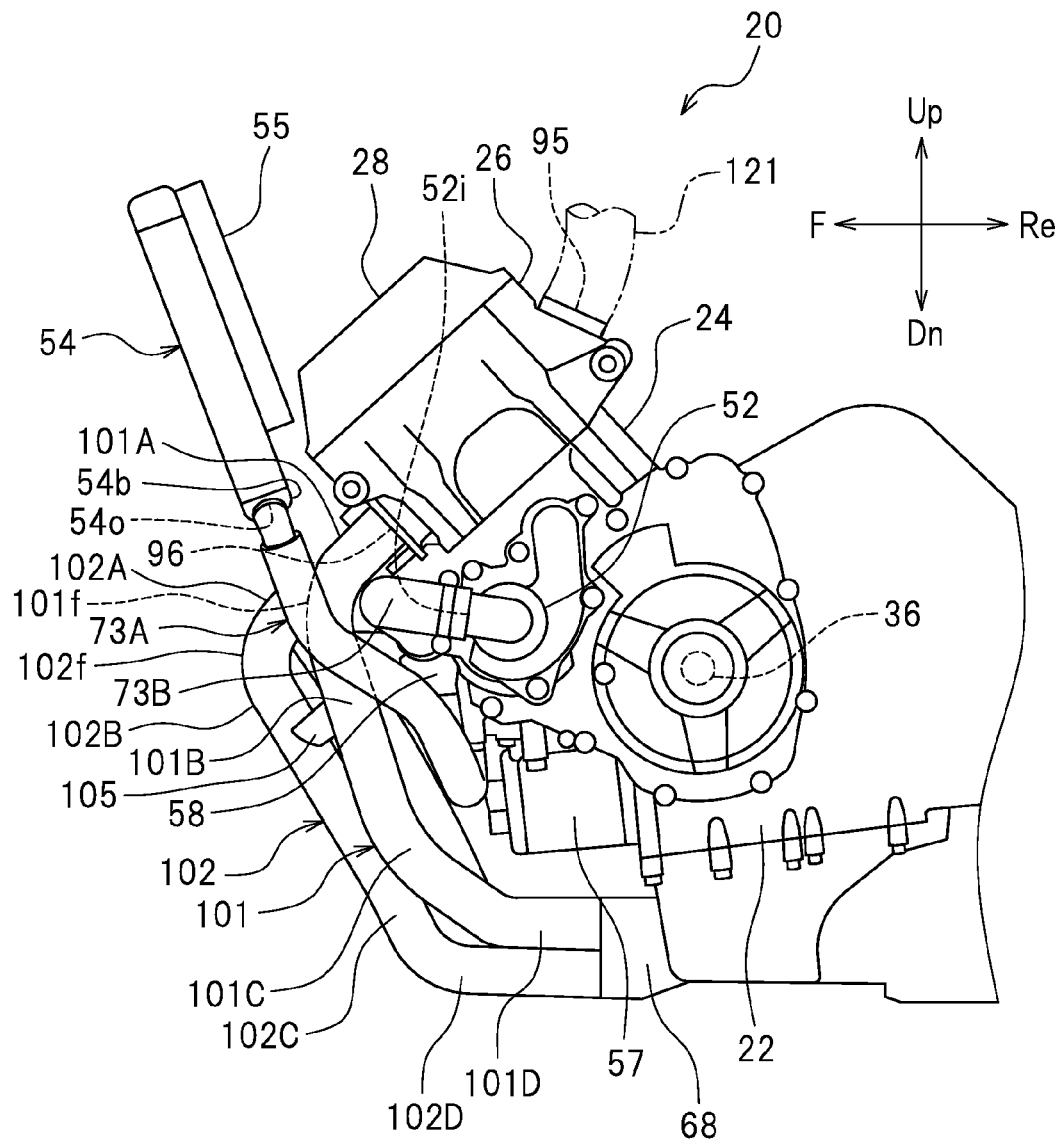
FIG. 8 is a left side view of the engine.

As illustrated in FIG. 8, in the side view of the vehicle, the first exhaust pipe 101 preferably includes an upper portion 101A that extends obliquely downward and forward from the cylinder head 26, first and second intermediate portions 101B and 101C that extend obliquely downward and rearward from the upper portion 101A, and a lower portion 101D that extends rearward from the second intermediate portion 101C. As illustrated in FIGS. 7 and 8, in the side view of the vehicle, the second exhaust pipe 102 preferably includes an upper portion 102A that extends obliquely downward and forward from the cylinder head 26, first and second intermediate portions 102B and 102C that extend obliquely downward and rearward from the upper portion 102A, and a lower portion 102D that extends rearward from the second intermediate portion 102C. As illustrated in FIG. 7, in the side view of the vehicle, the third exhaust pipe 103 preferably includes an upper portion 103A that extends obliquely downward and forward from the cylinder head 26, first and second intermediate portions 103B and 103C that extend obliquely downward and rearward from the upper portion 103A, and a lower portion 103D that extends rearward from the second intermediate portion 103C. As illustrated in FIG. 6, in the front view of the vehicle, the first intermediate portions 101B, 102B, and 103B extend obliquely downward and rightward, and the second intermediate portions 101C, 102C, and 103C extend obliquely downward and leftward.

As illustrated in FIG. 6, the first intermediate portion 101B and the second intermediate portion 101C of the first exhaust pipe 101 are at least partially located rightward of an axis 31c of the first cylinder 31 in the front view of the vehicle. The first intermediate portion 102B and the second intermediate portion 102C of the second exhaust pipe 102 are at least partially located rightward of an axis 32c of the second cylinder 32 in the front view of the vehicle. The first intermediate portion 103B and the second intermediate portion 103C of the third exhaust pipe 103 are at least partially located rightward of an axis 33c of the third cylinder 33 in the front view of the vehicle. In this manner, in the front view of the vehicle, the first exhaust pipe 101 preferably includes a portion located rightward of the axis 31c of the cylinder 31 with which the exhaust pipe 101 is in communication, the second exhaust pipe 102 preferably includes a portion located rightward of the axis 32c of the cylinder 32 with which the exhaust pipe 102 is in communication, and the third exhaust pipe 103 preferably includes a portion located rightward of the axis 33c of the cylinder 33 with which the exhaust pipe 103 is in communication.

The first intermediate portion 102B and the second intermediate portion 102C of the second exhaust pipe 102 partially overlap with the axis 31c of the first cylinder 31 in the front view of the vehicle. The first intermediate portion 103B and the second intermediate portion 103C of the third exhaust pipe 103 partially overlap with the axis 32c of the second cylinder 32 in the front view of the vehicle.

The first exhaust pipe 101 and the second exhaust pipe 102 are connected to each other through a first connection pipe 105 and are in communication with each other via the first connection pipe 105. The second exhaust pipe 102 and the third exhaust pipe 103 are connected to each other through a second connection pipe 106 and are in communication with each other via the second connection pipe 106. The first connection pipe 105 preferably includes a first connection 105a connected to a portion of the first exhaust pipe 101 which is located upstream of a midpoint position of the first exhaust pipe 101, and a second connection 105b connected to a portion of the second exhaust pipe 102 which is located upstream of a midpoint position of the second exhaust pipe 102. The second connection pipe 106 preferably includes a first connection 106a connected to a portion of the second exhaust pipe 102 which is located upstream of the midpoint position of the second exhaust pipe 102, and a second connection 106b connected to a portion of the third exhaust pipe 103 which is located upstream of a midpoint position of the third exhaust pipe 103. Note that the "midpoint positions of the first, second, and third exhaust pipes 101, 102, and 103" refer to midpoint positions of the first, second, and third exhaust pipes 101, 102, and 103 in longitudinal directions thereof. The midpoint positions of the first, second, and third exhaust pipes 101, 102, and 103 correspond to midpoints between upstream ends of the first, second, and third exhaust pipes 101, 102, and 103 which are connected to the exhaust pipe connection ports 97, and connections 101E, 102E, and 103E which define downstream ends of the first, second, and third exhaust pipes 101, 102, and 103 and will be described below. It is to be noted that the connections of the first connection pipe 105 and the second connection pipe 106 are not limited to any particular positions. Either or both of the first connection pipe 105 and the second connection pipe 106 may be omitted.

An exhaust manifold 68 is disposed below the crankcase 22. The exhaust manifold 68 is disposed leftward of a vehicle center line CL in the front view of the vehicle. Note that the term "vehicle center line CL" refers to a line that passes through a lateral center of the motorcycle 1 and coincides with a center line of the front wheel 5 and a center line of the rear wheel 14. The connections 101E, 102E, and 103E of the first, second, and third exhaust pipes 101, 102, and 103 are connected to the exhaust manifold 68. As illustrated in FIG. 2, a muffler 110 is connected to a rear end portion of the exhaust manifold 68.

The connection 101E of the first exhaust pipe 101 is located rightward of the connection 103E of the third exhaust pipe 103 in the front view of the vehicle. The connection 102E of the second exhaust pipe 102 is disposed below the connection 101E of the first exhaust pipe 101 and the connection 103E of the third exhaust pipe 103. The connection 102E of the second exhaust pipe 102 is disposed obliquely downward and leftward of the connection 101E of the first exhaust pipe 101, and obliquely downward and rightward of the connection 103E of the third exhaust pipe 103 in the front view of the vehicle.

As illustrated in FIG. 8, the radiator 54 is disposed forward of the engine 20. The radiator 54 is disposed forward of the cylinder body 24, the cylinder head 26, and the head cover 28. The radiator 54 is inclined forward. An upper end portion of the radiator 54 is located forward of a lower end portion of the radiator 54. A fan 55 is disposed rearward of the radiator 54.

As illustrated in FIG. 7, a front end 102f of the second exhaust pipe 102 is located forward of a rear end 54b of the radiator 54 in the side view of the vehicle. As used herein, the terms "front end" and "rear end" refer to a foremost portion and a rearmost portion, respectively. A front end 103f of the third exhaust pipe 103 is located rearward of the rear end 54b of the radiator 54. As illustrated in FIG. 8, a front end 101f of the first exhaust pipe 101 is located rearward of the rear end 54b of the radiator 54 in the side view of the vehicle. Of the first to third exhaust pipes 101 to 103, the second exhaust pipe 102 which is the longest extends farthest forward. Furthermore, of the first to third exhaust pipes 101 to 103, the second exhaust pipe 102 which is the longest extends farthest downward.

As illustrated in FIG. 6, the thermostat 58 is disposed rightward of the vehicle center line CL in the front view of the vehicle. The thermostat 58 is disposed forward of the engine 20. The thermostat 58 is disposed forward of the crankcase 22 and the cylinder body 24. The oil cooler 56 is attached to the crankcase 22. The oil cooler 56 is disposed forward of the crankcase 22.

A portion of the third exhaust pipe 103 is disposed forward of the oil cooler 56. A portion of the second exhaust pipe 102 is disposed forward of the thermostat 58. Another portion of the second exhaust pipe 102 is disposed forward of an oil filter 57.

A cooling water passage (not illustrated) through which cooling water flows is provided inside the engine 20. An outlet 80o of the cooling water passage is provided at a front portion of the cylinder body 24. The engine 20 preferably includes water piping 72A connected to the outlet 80o and an inlet 54i (see FIG. 7) of the radiator 54, water piping 73A connected to an outlet 54o (see FIG. 8) of the radiator 54 and the thermostat 58, water piping 73B connected to the thermostat 58 and a suction port 52i (see FIG. 8) of the water pump 52, water piping 74A connected to the outlet 80o of the cooling water passage and the oil cooler 56, and water piping 74B connected to the oil cooler 56 and the thermostat 58.

As illustrated in FIG. 7, a portion of the water piping 72A is disposed rearward of a portion of the third exhaust pipe 103 and forward of the cylinder body 24. As illustrated in FIG. 8, a portion of the water piping 73B is disposed rearward of the first exhaust pipe 101 and forward of the cylinder body 24. As illustrated in FIG. 6, a portion of the water piping 74A is disposed rearward of a portion of the third exhaust pipe 103 and forward of the crankcase 22 and the cylinder body 24. A portion of the water piping 74B is disposed rearward of a portion of the second exhaust pipe 102 and a portion of the third exhaust pipe 103 and forward of the crankcase 22 and the cylinder body 24.

As described above, the motorcycle 1 according to the present preferred embodiment preferably includes the parallel three cylinder engine 20, for example. In the parallel three cylinder engine 20, if an attempt is made to equalize the lengths of the three exhaust pipes 101 to 103, flexibility of locating the exhaust pipes 101 to 103 might be reduced, and/or the exhaust pipes 101 to 103 might be complicated in shape. However, in the present preferred embodiment, the three exhaust pipes 101 to 103 have different lengths. According to the present preferred embodiment, it is unnecessary to equalize the lengths of the three exhaust pipes 101 to 103, thus making it possible to increase the flexibility of locating the exhaust pipes 101 to 103 and to prevent the exhaust pipes 101 to 103 from being complicated in shape.

Unfortunately, merely allowing the exhaust pipes 101 to 103 to have different lengths is likely to cause combustion variations between the cylinders 31 to 33, thus making it difficult for the parallel three cylinder engine 20 to deliver its original performance. However, in the present preferred embodiment, the three intake pipes 121 to 123 have different lengths. According to the present preferred embodiment, it is unnecessary to equalize the lengths of the three intake pipes 121 to 123, thus making it possible to set the length of each of the intake pipes 121 to 123 without being restricted by the lengths of the other intake pipes.

According to the present preferred embodiment, the second intake pipe 122 that is the shortest of the three intake pipes 121 to 123 is in communication with the second cylinder 32 with which the second exhaust pipe 102 that is the longest of the three exhaust pipes 101 to 103 is in communication. The third intake pipe 123 that is the longest of the three intake pipes 121 to 123 is in communication with the third cylinder 33 with which the third exhaust pipe 103 that is the shortest of the three exhaust pipes 101 to 103 is in communication. Consequently, it is possible to suitably reduce combustion variations between the cylinders 31 to 33 without performing complicated control.

The second exhaust pipe 102, which is the longest of the three exhaust pipes 101 to 103, is in communication with the second cylinder 32, i.e., the center one of the three cylinders 31 to 33. The second exhaust pipe 102, which is the longest of the three exhaust pipes 101 to 103, is centrally disposed, thus making it easy to suitably dispose the exhaust pipes 101 to 103 so that interference therebetween is prevented.

The first, second, and third intake pipes 121, 122 and 123 have different lengths but are connected to the same air cleaner 59. The first, second, and third intake pipes 121, 122, and 123 are inserted into the air cleaner 59 through the insertion openings 59d. The opening end 121a of the first intake pipe 121, the opening end 122a of the second intake pipe 122, and the opening end 123a of the third intake pipe 123 are disposed inside the air cleaner 59. As illustrated in FIG. 5, the length L1 between the opening end 121a and the insertion opening 59d, the length L2 between the opening end 122a and the insertion opening 59d, and the length L3 between the opening end 123a and the insertion opening 59d are different from each other. Thus, the portions of the intake pipes 121 to 123 which are disposed inside of the air cleaner 59 have different lengths, and therefore, the portions of the intake pipes 121 to 123 which are located outside of the air cleaner 59 do not need to have different lengths. As a result, the flexibility of locating the intake pipes 121 to 123 is increased.

Figure 9:
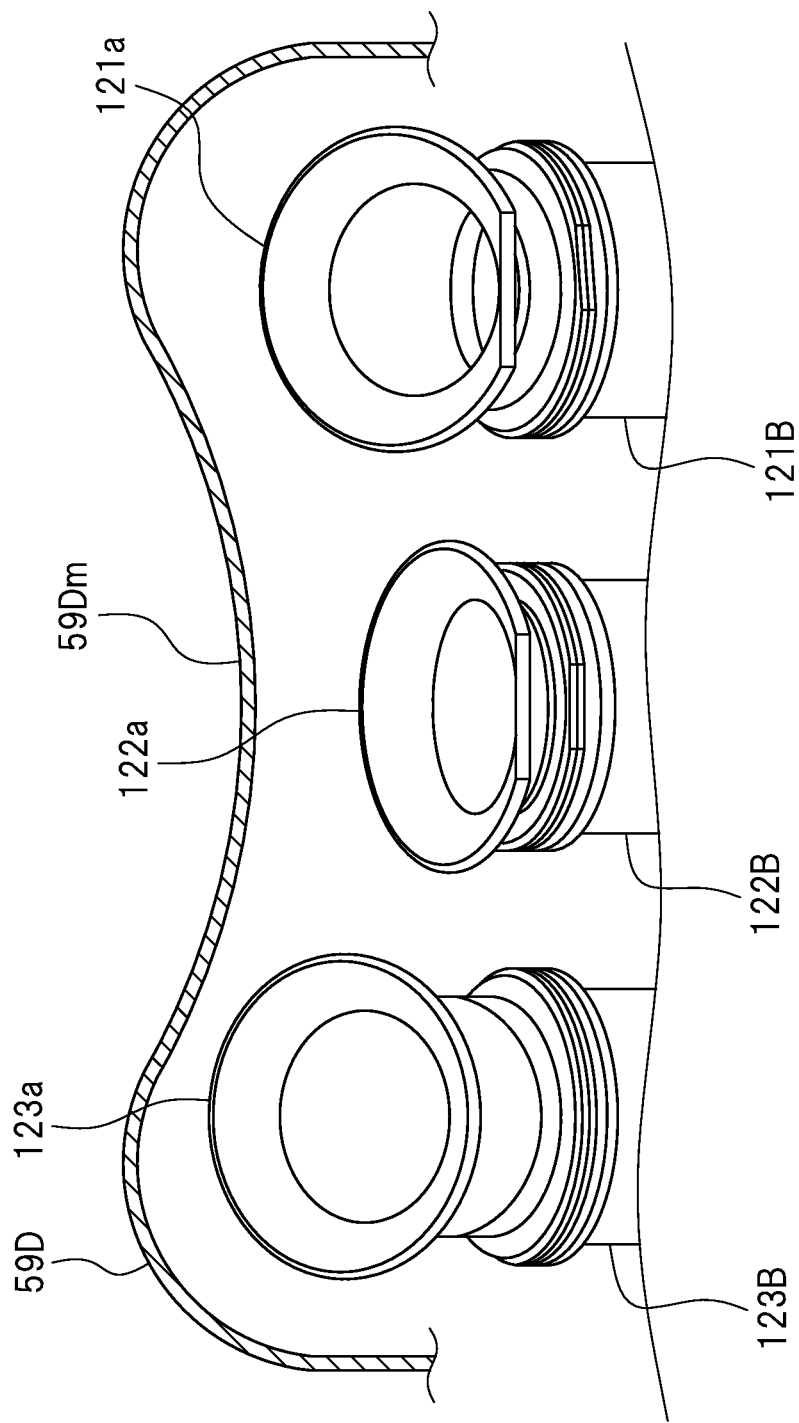
FIG. 9 is a partial cross-sectional view of an air cleaner according to a variation of the present invention.

The length L2 between the opening end 122a and the insertion opening 59d is shorter than the length L1 between the opening end 121a and the insertion opening 59d and is also shorter than the length L3 between the opening end 123a and the insertion opening 59d. As illustrated in FIG. 6, the portion 122B of the centrally-disposed second intake pipe 122 located inside of the air cleaner 59 is shorter than the portion 121B of the first intake pipe 121 located inside of the air cleaner 59 and is also shorter than the portion 123B of the third intake pipe 123 located inside of the air cleaner 59. Therefore, as illustrated in FIG. 9, a concave 59Dm may be provided in the center of the air cleaner case 59D. During traveling, the rider of the motorcycle 1 may lean forward in order to reduce air resistance received by his or her body. When the air cleaner 59 is disposed forward of the seat 11, the rider is allowed to lean forward easily by providing the concave 59Dm in the air cleaner case 59D.

As illustrated in FIG. 6, the engine 20 preferably includes the exhaust manifold 68 to which the three exhaust pipes 101 to 103 are connected. The exhaust manifold 68 is disposed below the crankcase 22, and therefore, an overall lateral length of the engine 20 and the exhaust manifold 68 is shorter than when the exhaust manifold 68 is disposed rightward or leftward of the crankcase 22. As a result, slimming of the motorcycle 1 including the parallel three cylinder engine 20 is facilitated.

As mentioned above, the left and right in FIG. 3 correspond to the right and left in the front view of the vehicle. As illustrated in FIG. 3, the first cylinder 31 is disposed rightward of the vehicle center line CL in the front view of the vehicle, and the third cylinder 33 is disposed leftward of the vehicle center line CL in the front view of the vehicle. As illustrated in FIG. 6, the exhaust manifold 68 is disposed leftward of the vehicle center line CL in the front view of the vehicle. When the exhaust manifold 68 is disposed so as to be deviated to the left in this manner, a distance between the left exhaust pipe connection port 97 and the exhaust manifold 68 and a distance between the right exhaust pipe connection port 97 and the exhaust manifold 68 are different from each other. Hence, if an attempt is made to equalize the lengths of the three exhaust pipes 101 to 103, the locations of the exhaust pipes 101 to 103 are severely restricted, and the exhaust pipes 101 to 103 are likely to be complicated in shape. However, according to the present preferred embodiment, it is possible to reduce combustion variations between the cylinders 31 to 33 without equalizing the lengths of the exhaust pipes 101 to 103 as mentioned above. Consequently, in the parallel three cylinder engine 20, the exhaust manifold 68 is easily disposed so as to be deviated to the left. By the same token, the exhaust manifold 68 may be disposed rightward of the vehicle center line CL in the front view of the vehicle.

As illustrated in FIG. 6, in the front view of the vehicle, the exhaust manifold 68 is disposed leftward of the vehicle center line CL, and the three exhaust pipes 101 to 103 preferably include portions located rightward of the axes 31c to 33c of the cylinders 31 to 33 with which the exhaust pipes 101 to 103 are in communication, respectively. In order to allow the engine 20 to deliver its original performance, it is important to sufficiently ensure the lengths of the exhaust pipes 101 to 103. The exhaust pipes 101 to 103 each have such a shape so as to extend rightward and then extend leftward in the front view of the vehicle. Therefore, the lengths of the exhaust pipes 101 to 103 are sufficiently ensured within a small space around the crankcase 22, the cylinder body 24, and the cylinder head 26. As a result, the exhaust pipes 101 to 103 are compactly disposed while the original performance of the engine 20 is maintained.

Alternatively, in the front view of the vehicle, the exhaust manifold 68 may be disposed rightward of the vehicle center line CL, and the three exhaust pipes 101 to 103 may include portions located leftward of the axes 31c to 33c of the cylinders 31 to 33 with which the exhaust pipes 101 to 103 are in communication, respectively. Also in that case, the exhaust pipes 101 to 103 are compactly disposed while the original performance of the engine 20 is maintained.

In the front view of the vehicle, the second exhaust pipe 102 preferably includes a portion that overlaps with the axis 31c of the first cylinder 31 with which the adjacent first exhaust pipe 101 is in communication. In the front view of the vehicle, the third exhaust pipe 103 preferably includes a portion that overlaps with the axis 32c of the second cylinder 32 with which the adjacent second exhaust pipe 102 is in communication. Such a structure makes it possible to sufficiently ensure the lengths of the second exhaust pipe 102 and the third exhaust pipe 103.

The exhaust pipes 101 to 103 preferably include the connections 101E to 103E connected to the exhaust manifold 68, respectively. The connection 102E of the second exhaust pipe 102 that is the longest of the exhaust pipes 101 to 103 is disposed below the connection 101E of the exhaust pipe 101 and the connection 103E of the exhaust pipe 103. According to the present preferred embodiment, the exhaust pipes 101 to 103 are not restricted to being equal in length, and therefore, the connections 101E to 103E of the exhaust pipes 101 to 103 can be easily disposed at such positions. The lateral length of the exhaust manifold 68 is shorter than when the connections 101E to 103E of the three exhaust pipes 101 to 103 are arranged in alignment with each other in the lateral direction of the motorcycle 1.

As illustrated in FIG. 6, the first exhaust pipe 101 and the second exhaust pipe 102 are connected to each other through the first connection pipe 105, and the second exhaust pipe 102 and the third exhaust pipe 103 are connected to each other through the second connection pipe 106. Thus, pressure fluctuations in exhaust gas inside the first, second, and third exhaust pipes 101, 102, and 103 are reduced, and therefore, fluctuations in output torque of the engine 20 are reduced.

The connections of the first connection pipe 105 may be located at any appropriate positions. For example, in the present preferred embodiment, the first connection 105a of the first connection pipe 105 is connected to the portion of the first exhaust pipe 101 which is located upstream of the midpoint position of the first exhaust pipe 101, and the second connection 105b of the first connection pipe 105 is connected to the portion of the second exhaust pipe 102 which is located upstream of the midpoint position of the second exhaust pipe 102. The connections of the second connection pipe 106 may be located at any appropriate positions. For example, in the present preferred embodiment, the first connection 106a of the second connection pipe 106 is connected to the portion of the second exhaust pipe 102 which is located upstream of the midpoint position of the second exhaust pipe 102, and the second connection 106b of the second connection pipe 106 is connected to the portion of the third exhaust pipe 103 which is located upstream of the midpoint position of the third exhaust pipe 103. Thus, pressure fluctuations in the exhaust pipes 101 to 103 are reduced in farther upstream regions thereof. As a result, fluctuations in the output torque of the engine 20 are more effectively reduced.

In the present preferred embodiment, the term "intake pipes" refers to air passages between the throttle bodies 53 and the opening ends 121a to 123a inside the air cleaner 59. In the present preferred embodiment, the intake pipes 121 to 123 are each preferably provided by a single pipe member, for example. Alternatively, one or two or more of the intake pipes 121 to 123 may be provided by a plurality of pipe members.

In the present preferred embodiment, the term "exhaust pipes" refers to exhaust gas passages between the exhaust pipe connection ports 97 of the cylinder head 26 and the exhaust manifold 68. In the present preferred embodiment, the exhaust pipes 101 to 103 are each preferably provided by a single pipe member, for example. Alternatively, one or two or more of the exhaust pipes 101 to 103 may be provided by a plurality of pipe members.

As illustrated in FIG. 6, in the present preferred embodiment, the air cleaner case 59D is provided with the three separate insertion openings 59d, and thus the three insertion openings 59d into which the intake pipes 121 to 123 are inserted are independent of one another. Alternatively, the two or three insertion openings 59d may be provided continuously. For example, the three insertion openings 59d into which the intake pipes 121 to 123 are inserted may be continuous with each other, so that the air cleaner case 59D is apparently provided with a single opening. In other words, the three insertion openings 59d may be combined into a single opening. Herein, irrespective of the apparent number of the openings, the three insertion openings 59d exist so long as the three intake pipes 121 to 123 are inserted thereinto.

In the present preferred embodiment, the three insertion openings 59d are preferably arranged in the lateral direction of the motorcycle 1. However, the locations of the three insertion openings 59d are not limited to any particular locations. For example, one of the insertion openings 59d may be located above or below the other insertion openings 59d.

The straddle-type vehicle according to the present preferred embodiment is a "street" motorcycle 1. Alternatively, the straddle-type vehicle may be any other type of motorcycle other than a street motorcycle. The term "straddle-type vehicle" refers to a vehicle that a rider straddles when getting on the vehicle. The straddle-type vehicle is not limited to the motorcycle 1, but may be any other vehicle such as an ROV (Recreational Off-Highway Vehicle), for example.

The engine 20 is not limited to a water-cooled engine, but may be an air-cooled engine.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
   a head pipe;
   a body frame including a main frame extending obliquely downward and rearward from the head pipe and a seat frame extending obliquely upward and rearward from the main frame; and
   a three cylinder internal combustion engine supported by the body frame, the three cylinder internal combustion engine including:
      a first cylinder;
      a second cylinder disposed leftward of the first cylinder in a front view of the vehicle;
      a third cylinder disposed leftward of the second cylinder in the front view of the vehicle;
      a first intake pipe in communication with the first cylinder;
      a second intake pipe in communication with the second cylinder;
      a third intake pipe in communication with the third cylinder;
      a first exhaust pipe in communication with the first cylinder;
      a second exhaust pipe in communication with the second cylinder; and
      a third exhaust pipe in communication with the third cylinder; wherein
      the first, second, and third exhaust pipes have different lengths; and
      the first, second, and third intake pipes have different lengths.

2. The straddle-type vehicle according to claim 1, wherein a shortest of the first, second, and third intake pipes is in communication with a cylinder with which a longest of the first, second, and third exhaust pipes is in communication; and
   a longest of the first, second, and third intake pipes is in communication with a cylinder with which a shortest of the first, second, and third exhaust pipes is in communication.

3. The straddle-type vehicle according to claim 2, wherein the longest of the first, second, and third exhaust pipes is the second exhaust pipe.

4. The straddle-type vehicle according to claim 1, further comprising an air cleaner connected to the first, second, and third intake pipes.

5. The straddle-type vehicle according to claim 4, wherein the air cleaner includes:
   a first insertion opening into which the first intake pipe is inserted;
   a second insertion opening into which the second intake pipe is inserted; and
   a third insertion opening into which the third intake pipe is inserted; wherein
   the first intake pipe includes a first opening end disposed inside the air cleaner;
   the second intake pipe includes a second opening end disposed inside the air cleaner;
   the third intake pipe includes a third opening end disposed inside the air cleaner; and
   a length of the first intake pipe from the first insertion opening to the first opening end, a length of the second intake pipe from the second insertion opening to the second opening end, and a length of the third intake pipe from the third insertion opening to the third opening end are different from each other.

6. The straddle-type vehicle according to claim 1, wherein the three cylinder internal combustion engine further includes:
   a crankcase;
   a cylinder body that contains the first, second, and third cylinders and is connected to the crankcase; and
   a cylinder head to which the first, second, and third intake pipes and the first, second, and third exhaust pipes are connected, the cylinder head being connected to the cylinder body; wherein
   the straddle-type vehicle further comprises an exhaust manifold which is disposed below the crankcase and to which the first, second, and third exhaust pipes are connected.

7. The straddle-type vehicle according to claim 6, wherein the first cylinder is disposed rightward of a vehicle center line in the front view of the vehicle;
   the third cylinder is disposed leftward of the vehicle center line in the front view of the vehicle; and
   the exhaust manifold is disposed rightward or leftward of the vehicle center line in the front view of the vehicle.

8. The straddle-type vehicle according to claim 7, wherein when one of a rightward end and a leftward end in the front view of the vehicle is defined as a first end and the other end is defined as a second end, the exhaust manifold is disposed closer to the first end than the vehicle center line, the first exhaust pipe includes a portion located closer to the second end than an axis of the first cylinder, the second exhaust pipe includes a portion located closer to the second end than an axis of the second cylinder, and the third exhaust pipe includes a portion located closer to the second end than an axis of the third cylinder.

9. The straddle-type vehicle according to claim 6, wherein the first, second, and third exhaust pipes each includes a connection that is connected to the exhaust manifold; and
   the connection of a longest of the first, second, and third exhaust pipes is disposed below the connections of the other two exhaust pipes.

10. The straddle-type vehicle according to claim 1, wherein in the front view of the vehicle, at least one of the first, second, and third exhaust pipes includes a portion that overlaps with an axis of a cylinder with which an adjacent exhaust pipe is in communication.

11. The straddle-type vehicle according to claim 1, further comprising:
    a first connection pipe connected to the first exhaust pipe and the second exhaust pipe; and
    a second connection pipe connected to the second exhaust pipe and the third exhaust pipe.

12. The straddle-type vehicle according to claim 11, wherein the first connection pipe includes:
    a first connection connected to a portion of the first exhaust pipe which is located upstream of a midpoint position of the first exhaust pipe; and
    a second connection connected to a portion of the second exhaust pipe which is located upstream of a midpoint position of the second exhaust pipe; wherein
    the second connection pipe includes:

a first connection connected to a portion of the second exhaust pipe which is located upstream of the midpoint position in a longitudinal direction of the second exhaust pipe; and a second connection connected to a portion of the third exhaust pipe which is located upstream of a midpoint position in a longitudinal direction of the third exhaust pipe.

13. The straddle-type vehicle according to claim 1, wherein the straddle-type vehicle is a motorcycle.

14. A straddle-type vehicle comprising:

a head pipe;

a body frame including a main frame extending obliquely downward and rearward from the head pipe and a seat frame extending obliquely upward and rearward from the main frame; and an internal combustion engine supported by the body frame, the internal combustion engine including:
  a first cylinder;
  a second cylinder disposed leftward of the first cylinder in a front view of the vehicle;
  a third cylinder disposed leftward of the second cylinder in the front view of the vehicle;
  a first intake pipe in communication with the first cylinder;
  a second intake pipe in communication with the second cylinder;
  a third intake pipe in communication with the third cylinder;
  a first exhaust pipe in communication with the first cylinder;
  a second exhaust pipe in communication with the second cylinder; and
  a third exhaust pipe in communication with the third cylinder; wherein the first, second, and third exhaust pipes have different lengths;

the first, second, and third intake pipes have different lengths; and a shortest of the first, second, and third intake pipes is in communication with a cylinder with which a longest of the first, second, and third exhaust pipes is in communication.

15. A straddle-type vehicle comprising:

a head pipe;

a body frame including a main frame extending obliquely downward and rearward from the head pipe and a seat frame extending obliquely upward and rearward from the main frame; and an internal combustion engine supported by the body frame, the internal combustion engine including:
  a first cylinder;
  a second cylinder disposed leftward of the first cylinder in a front view of the vehicle;
  a third cylinder disposed leftward of the second cylinder in the front view of the vehicle;
  a first intake pipe in communication with the first cylinder;
  a second intake pipe in communication with the second cylinder;
  a third intake pipe in communication with the third cylinder;
  a first exhaust pipe in communication with the first cylinder;
  a second exhaust pipe in communication with the second cylinder; and
  a third exhaust pipe in communication with the third cylinder; wherein the first, second, and third exhaust pipes have different lengths;

the first, second, and third intake pipes have different lengths; and a longest of the first, second, and third intake pipes is in communication with a cylinder with which a shortest of the first, second, and third exhaust pipes is in communication.

* * * * *